(12) United States Patent
Nachenberg et al.

(10) Patent No.: US 8,312,537 B1
(45) Date of Patent: Nov. 13, 2012

(54) REPUTATION BASED IDENTIFICATION OF FALSE POSITIVE MALWARE DETECTIONS

(75) Inventors: Carey S. Nachenberg, Northridge, CA (US); Kent E. Griffin, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1252 days.

(21) Appl. No.: 12/058,490

(22) Filed: Mar. 28, 2008

(51) Int. Cl.
*H04L 29/06* (2006.01)

(52) U.S. Cl. ........... 726/22; 726/23; 726/24; 726/25; 709/201; 709/203; 709/217; 709/219; 705/64

(58) Field of Classification Search .................. None
See application file for complete search history.

(56) References Cited

U.S. PATENT DOCUMENTS

| | | | | |
|---|---|---|---|---|
| 5,951,698 A * | 9/1999 | Chen et al. | .................. | 714/38.1 |
| 7,290,282 B1 * | 10/2007 | Renert et al. | .................. | 726/24 |
| 7,454,418 B1 * | 11/2008 | Wang | .................. | 1/1 |
| 7,516,150 B1 * | 4/2009 | McCorkendale et al. | .................. | 1/1 |
| 7,526,809 B2 * | 4/2009 | Liang et al. | .................. | 726/24 |
| 7,549,169 B1 * | 6/2009 | Sobel et al. | .................. | 726/26 |
| 7,865,965 B2 * | 1/2011 | Kramer et al. | .................. | 726/30 |
| 7,882,561 B2 * | 2/2011 | Costea et al. | .................. | 726/24 |
| 7,895,659 B1 * | 2/2011 | Cusmariu | .................. | 726/25 |
| 7,900,255 B1 * | 3/2011 | Mayr et al. | .................. | 726/23 |
| 7,974,998 B1 * | 7/2011 | Chang | .................. | 709/201 |
| 8,001,606 B1 * | 8/2011 | Spertus | .................. | 726/25 |
| 8,019,689 B1 * | 9/2011 | Nachenberg | .................. | 705/64 |
| 8,201,255 B1 * | 6/2012 | Nachenberg | .................. | 726/24 |
| 8,214,977 B2 * | 7/2012 | Szor | .................. | 26/24 |
| 2006/0107321 A1 * | 5/2006 | Tzadikario | .................. | 726/22 |
| 2006/0212942 A1 * | 9/2006 | Barford et al. | .................. | 726/24 |
| 2007/0192855 A1 * | 8/2007 | Hulten et al. | .................. | 726/22 |
| 2008/0005223 A1 * | 1/2008 | Flake et al. | .................. | 709/203 |
| 2008/0104180 A1 * | 5/2008 | Gabe | .................. | 709/206 |
| 2009/0282476 A1 * | 11/2009 | Nachenberg et al. | .................. | 726/22 |
| 2009/0297048 A1 * | 12/2009 | Slotine et al. | .................. | 382/224 |
| 2009/0328209 A1 * | 12/2009 | Nachenberg | .................. | 726/22 |
| 2010/0313270 A1 * | 12/2010 | Kim et al. | .................. | 726/24 |
| 2011/0047618 A1 * | 2/2011 | Evans et al. | .................. | 726/23 |
| 2011/0099634 A1 * | 4/2011 | Conrad et al. | .................. | 726/24 |
| 2011/0107424 A1 * | 5/2011 | Singh et al. | .................. | 726/24 |
| 2011/0173698 A1 * | 7/2011 | Polyakov et al. | .................. | 726/23 |

OTHER PUBLICATIONS

"IronPort Web Reputation: Protect and Defend Against URL-Based Threats," White Paper, IronPort Systems, Doc. Revised Feb. 2008, [online] [Retrieved on Aug. 25, 2008] Retrieved from the Internet<URL:http://www.ironport.com/pdf/ironport_web_reputation_whitepaper.pdf>.

* cited by examiner

*Primary Examiner* — Syed A. Zia (74) *Attorney, Agent, or Firm* — Fenwick & West LLP (57) ABSTRACT

A signature is identified in association with an entity at a client. A reputation score associated with the entity is identified, the reputation score indicating a likelihood that the entity will compromise the client. Whether the signature detection event is a false positive signature detection event is evaluated based on the reputation score and reported.

20 Claims, 6 Drawing Sheets

REPUTATION BASED IDENTIFICATION OF FALSE POSITIVE MALWARE DETECTIONS

BACKGROUND OF THE INVENTION

1. Field of the Invention

This invention pertains in general to computer security and in particular to the development of signatures to accurately identify malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Security computer systems and software for counteracting malware typically operate by seeking to identify malware signatures. Malware signatures contain data describing characteristics of known malware and can be used to determine whether an entity such as a computer file or a software application contains malware. Typically, a set of malware signatures is generated by a provider of security software and is deployed to security software on a user's computer. This set of malware signatures is then used by the security software to scan the user's computer for malware.

During malware signature generation, malware signatures are validated against entities that are known to not contain malware (i.e. innocuous entities) in order to ensure that the malware signatures do not provide false positive detections. In other words, the malware signatures are checked to make sure they do not falsely determine that innocuous entities contain malware. However, it is impossible to validate against all possible innocuous entities that can be encountered by user computers. Thus, even cross-validated signatures can produce false positive results on user computers.

Accordingly, there is a need in the art for decreasing false positive malware detections.

BRIEF SUMMARY

The above and other needs are met by systems, methods, and computer program products for evaluating a signature detection event.

One aspect provides a computer-implemented method for evaluating a signature detection event. A signature is identified in association with an entity (such as an executable file) at a client. A reputation score associated with the entity is identified, the reputation score indicating a likelihood that the entity will compromise the client. Whether the signature detection event is a false positive signature detection event is evaluated based on the reputation score and reported.

In another aspect, the described embodiments provide a computer system for evaluating a signature detection event. The system comprises a signature detection module adapted to identify a signature detection event indicating a detection of a malware signature in association with an entity at a client. The system further comprises a false positive evaluation module adapted to identify a reputation score associated with the entity, the reputation score indicating a likelihood that the entity will compromise the client. The false positive evaluation module is further adapted to evaluate whether the signature detection event is a false positive signature detection event based on the reputation score. The system further comprises a reporting module adapted to report whether the signature detection event is a false positive signature detection event.

Another aspect is embodied as a computer-readable storage medium encoded with computer program code for evaluating a signature detection event according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
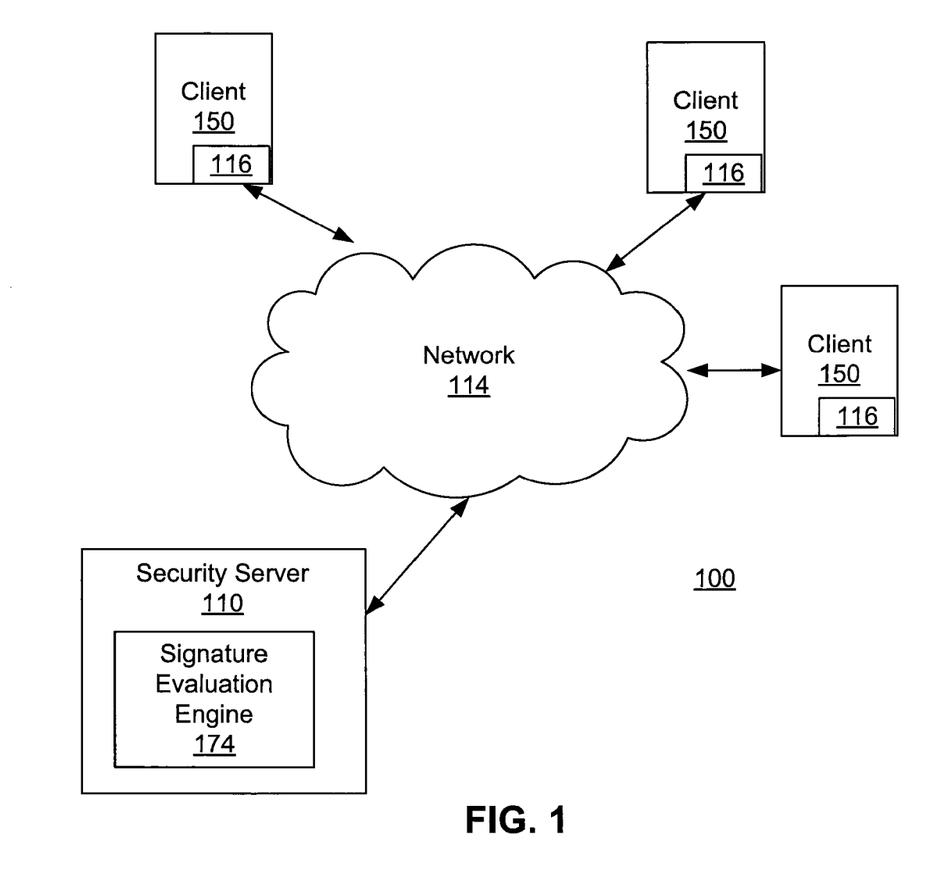
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 executes a signature evaluation engine 174. The signature evaluation engine 174 provides malware signatures to the clients 150. The signature evaluation engine 174 receives signature detection events from the clients 150 describing the identification of suspicious entities. The term "suspicious entities", as used herein, refers to entities such as software applications or files suspected to contain malware based on the detection of a malware signature in information associated with the entities. The signature evaluation engine 174 evaluates the signature detection events to determine whether the signature detection events are false positive signature detection events. A false positive signature detection event is a detection of a malware signature in information associated with an entity that is not malware, i.e. an innocuous entity. Malware signatures that are detected in innocuous entities are herein referred to as false positive signatures.

The signature evaluation engine 174 receives health information describing the health of each client 150 including entities installed or stored on the clients 150, hygiene of the clients 150 and system performance of the clients 150. The signature evaluation engine 174 generates reputation scores for entities, e.g., software applications, based on the health information received from the clients 150. A reputation score indicates the likelihood that the entity will compromise the client system. The signature evaluation engine 174 evaluates whether a signature detection event is a false positive signature detection event based on a reputation score for the suspicious entity identified in the signature detection event. If the signature detection event is a false positive signature detection event, the signature evaluation engine 174 reports the false positive signature to an administrator of the signature evaluation engine 174 and stores the false positive signature detection event for further analysis.

Each of the clients 150 executes a security module 116 to detect suspicious entities and malware. The security module 116 uses the malware signatures provided by the security server 110 to identify signature detection events. The security module 116 transmits signature detection event reports to the security server 110 for evaluation. The security module 116 receives the results of the signature detection event evaluation from the security server 110. The security module 116 updates the set of signatures based on false positive signatures identified during the evaluation of the signature detection event.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

Using reputation scores to evaluate signature detection events provides a mechanism for evaluating the signature detection events to identify false positive malware signatures and false positive signature detection events. This approach leverages health information from clients 150 on which the suspicious entities are installed or stored in order to determine whether the suspicious entities are malware or innocuous entities. Health information includes several indicators of the health of the client 150 such as: performance data for the client 150, entities downloaded on the client 150, and a rate at which malware is detected on the client 150. The reputation scores for the suspicious entities are computed without requiring the users to explicitly evaluate or judge the software applications. Thus, the approach is well-suited to computing environments where there are numerous unknown entities being installed or downloaded to the clients 150 and rapid development of malware signatures by the security server 110.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
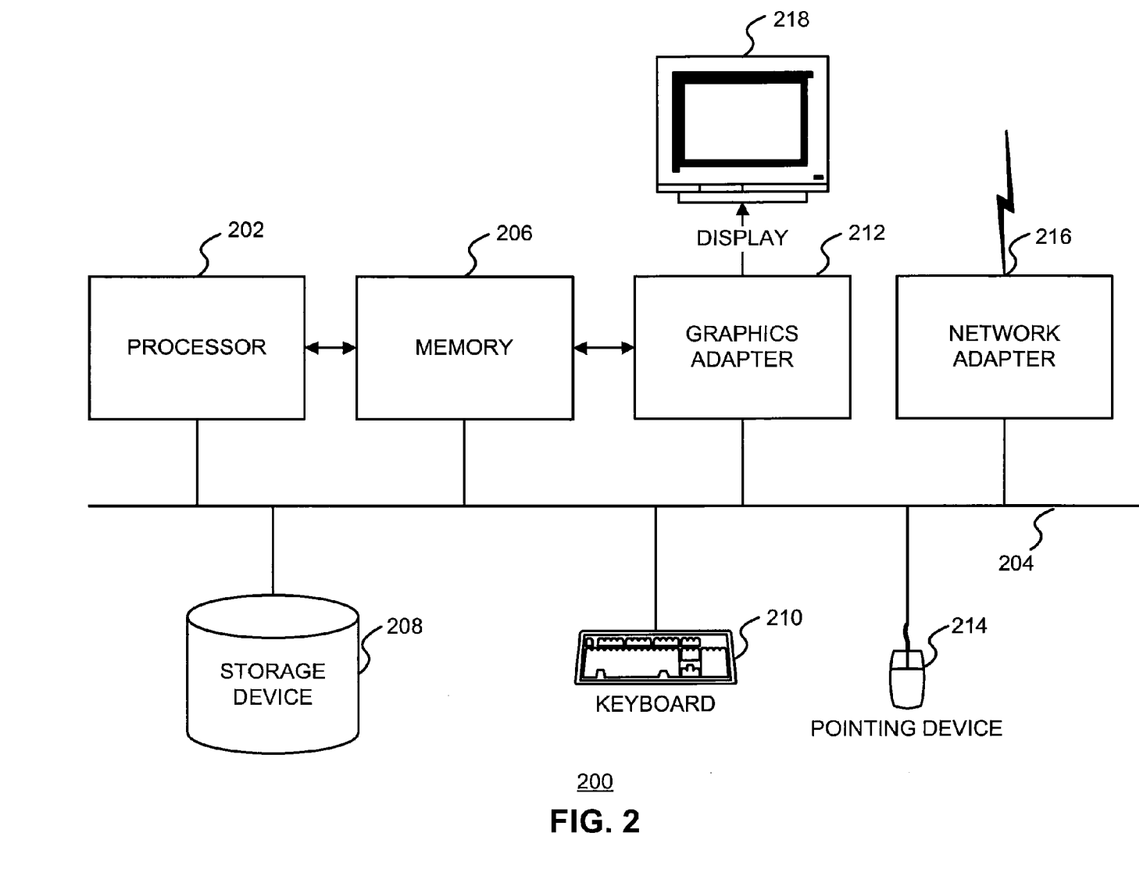
FIG. 2 is a high-level block diagram illustrating a typical computer for use as a security server 110 or a client 150.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other non-transitory computer-readable storage medium capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
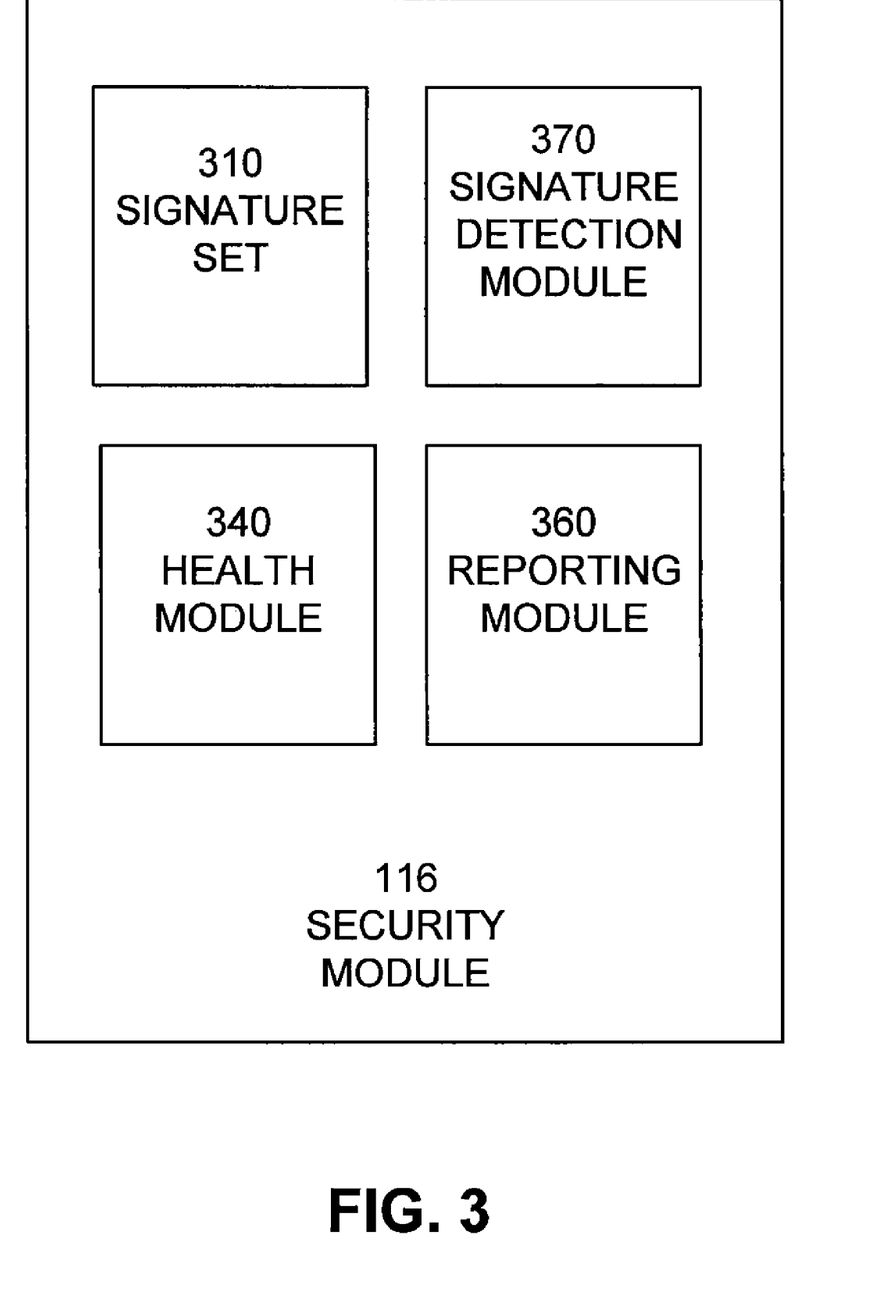
FIG. 3 is a high-level block diagram illustrating a detailed view of a security module 116 adapted to run on a client 150 according to one embodiment.

FIG. 3 is a high-level block diagram illustrating a detailed view of the security module 116 of a client 150 according to one embodiment. In some embodiments, the security module 116 is incorporated into an operating system executing on the client 150 while in other embodiments the security module 116 is a standalone application or part of another product. As shown in FIG. 3, the security module 116 includes multiple modules. Those of skill in the art will recognize that other embodiments of the security module 116 can have different and/or other modules than the ones described here, and that the functionalities can be distributed among the modules in a different manner.

The signature set 310 contains a set of malware signatures received from the security server 110. A malware signature is a characteristic such as a pattern or a heuristic that is used to uniquely identify an entity that is malware. In some embodiments, the signature set 310 may incorporate malware signatures received from other sources than the security server 110. The number of malware signatures in the signature set 310 may range from one malware signature to hundreds of thousands of malware signatures. The signature set 310 can be stored in any way on the client 150, for example, as a file or database. In some embodiments, the signature set 310 will include information regarding the type of malware threats they have been generated to identify.

A signature detection module 370 detects suspicious entities based on the signature set 310. In one embodiment, the signature detection module 370 scans the storage device 208 or memory 206 associated with the client 150 to identify information associated with the entities installed or stored on the storage device 208 or memory 206. The signature detection module 70 may scan the storage device 208 or memory 206 associated with the client 150 at a scheduled time or when a new entity is installed or stored on the client 150.

The signature detection module 370 scans the information associated with the entities using the signature set 310 to identify signature detection events based on an instance of a malware signature in the information associated with the entities. A signature detection event occurs when data in the information associated with entity satisfy the characteristics specified by a malware signature. The signature detection module 370 further quarantines the suspicious entities identified in the signature detection event. The suspicious entities may be quarantined, for example, by configuring the client 150 to prohibit execution of the suspicious entities and/or taking other actions to prevent any malicious code in the suspicious entities from causing harm.

The health module 340 monitors health information for the client 150 including entities installed or stored on the client 150, performance data for the client 150 and hygiene scores for the client 150. The health module 340 identifies the entities installed or stored on the clients 150. In one embodiment, the health module 340 scans a storage device 208 or memory 206 to identify the entities downloaded or installed on the client 150. According to the embodiment, the health module 340 may scan the storage device 208 or memory 206 to identify the entities installed or stored on the client 150 continuously or at scheduled times.

The health module 340 further monitors the hygiene score of the client 150 and performance data for the client 150. The hygiene score of the client 150 indicates a rate at which suspicious entities or malware are identified on the client 150. The performance data for the client 150 indicates performance metrics for the client. Performance metrics can include: latency metrics, throughput metrics, availability metrics and utilization metrics. Latency metrics evaluate a delay time between when an action is requested and performed on the client 150. Throughput metrics evaluate a number of actions on the client 150 per a unit of time, such as memory accesses per second. Availability metrics evaluate a fraction of time a component of the client 150 such as a processor 202 is available. Utilization metrics evaluate a fraction of time a component of the client 150 is utilized. According to the embodiment, the health module 340 may generate performance data intermittently or continuously.

The reporting module 360 communicates with the security server 110 via the network 114. The reporting module 360 receives the signature set 310 from the security server 110. The reporting module 360 reports signature detection events to the security server 110. A signature detection event report includes identifiers of the detected malware signatures in the signature detection event and the suspicious entity in which the signature was detected. The reporting module 360 also reports health information monitored by the health module 340.

The reporting module 360 receives results of signature detection event evaluations from the security server 110. The reporting module 360 updates the signature set 310 to remove false positive signatures if the signature detection event evaluation indicates a signature detection event is a false positive signature detection event. The reporting module 360 further remediates the client 150 if the signature detection event evaluation indicates the signature detection event not a false positive signature detection event, for example, by removing the suspicious entity. In some embodiments, the reporting module 260 may provide additional remediation after removing suspicious entities. The reporting module 260 may remediate the clients 150 by repairing corrupted entities on the client 150, for example by excising malware code from the corrupted entities.

Figure 4:
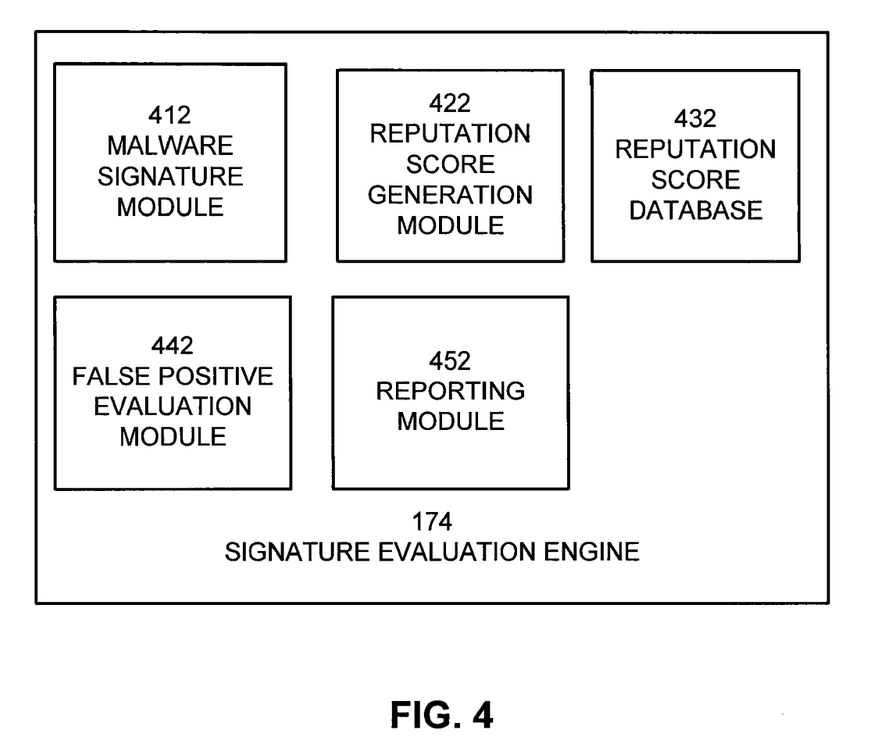
FIG. 4 is a high-level block diagram illustrating a detailed view of a signature evaluation engine 174 adapted to run on the security server 110 according to one embodiment.

FIG. 4 is a high-level block diagram illustrating a detailed view of the signature evaluation engine 174 according to one embodiment. As shown in FIG. 4, the signature evaluation engine 174 includes several modules. Those of skill in the art will recognize that other embodiments of the signature evaluation engine 174 can have different and/or other modules than the ones described here, and that the functionalities can be distributed among the modules in a different manner. In addition, the functions ascribed to the signature evaluation engine 174 can be performed by multiple servers.

A reporting module 452 communicates with the clients 150 via the network 114. The reporting module 452 receives signature detection event reports and health information from the clients 150. The reporting module 452 provides evaluations of the signature detection events to the clients 150. The reporting module 452 further provides signature sets 310 from the malware signature generation module 412 to the clients 150.

A malware signature module 412 provides malware signatures included in the signature sets. The malware signature module 412 provides malware signatures containing characteristics for identifying malware. These characteristics can include: hashes identifying files, heuristics identifying suspicious behaviors and patterns found within files associated with malware and/or in memory after malware is executed. In most embodiments, the malware signatures are created by a security software developer.

A reputation score generation module 422 generates reputation scores for entities based on the health information received from the clients 150 the entities are stored or installed on. The reputation score generation module 422 may combine any type of health information to generate a reputation score for the entities. In one embodiment, the reputation score generation module 422 generates a reputation score proportional to the number of clients 150 an entity is stored or installed on. This reputation score is based on the knowledge that an entity installed on a large number of clients 150 is more likely to be innocuous than an entity installed on a small number of clients 150.

In some embodiments, the reputation score generation module 422 generates the reputation scores for entities based on hygiene scores for the clients 150 the entities are stored or installed on. Entities installed on clients 150 with hygiene scores indicating a high rate of infection will be given a lower reputation score than entities installed on clients 150 with a low rate of infection. In some embodiments, the reputation score generation module 422 generates the reputation score based on performance data associated with clients 150 the entity is installed on. In a specific embodiment, the reputation score generation module 422 generates the reputation score based on aggregate values based on a combination of one or more performance metrics from each client 150 the entity is installed on.

The reputation score database 432 stores the generated reputation score for an entity in association with a unique identifier for the entity (e.g. a hash of the entity). In some embodiments, the reputation score database 410 stores information used to generate the reputations scores such as the number of clients 150 the entity is installed or stored on. The reputation score database 432 can, but does not necessarily, store the identifiers of the particular clients 150 that reported the health information used to generate the reputation scores.

A false positive evaluation module 442 evaluates the signature detection events to determine false positive signatures and false positive signature detection events. The false positive evaluation module 442 identifies the unique identifier for the suspicious entity from the signature detection event report. The false positive evaluation module 442 identifies a reputation score stored in association with the unique identifier for the suspicious entity in the reputation score database 432. The false positive evaluation module 442 determines whether the signature detection event is a false positive signature detection event based on the reputation score for the entity. The false positive evaluation module 442 determines that an entity is an innocuous entity and the signature detection event is a false positive signature detection event based on a reputation score indicating that the entity is unlikely to compromise a user's computer. Conversely, false positive evaluation module 442 determines that an entity is likely to by a suspicious entity based on the reputation score of the entity indicating that the entity is likely to compromise a user's computer.

In one embodiment, the false positive evaluation module 442 determines that a signature detection event is a false positive signature event based on the reputation score indicating that the suspicious entity is stored or installed on a number or percentage of the clients 150 exceeding a given threshold value. Accordingly, the false positive evaluation module 442 determines that a signature detection event is not a false positive signature event based on a reputation score indicating that the suspicious entity is stored or installed on a small percentage or number of the clients 150.

In another embodiment, the false positive evaluation module 442 may identify that the signature detection event is a false positive signature detection event based on the reputation score for the suspicious entity indicating that there is no significant difference in the aggregate performance values of the clients 150 on which the entity is stored or installed and the aggregate performance values of the clients 150 on which the entity is not stored or installed. In another embodiment, the false positive evaluation module 442 may identify that the signature detection event is a false positive signature detection event based on the reputation scores for the suspicious entity indicating that the clients 150 on which the suspicious entity is downloaded or installed have hygiene scores that are above or below a defined threshold value.

In some embodiments, the false positive evaluation module 442 weights multiple individual components of each reputation score separately when evaluating whether the signature detection event is a false positive signature detection event. The multiple individual components can include: the percentage of clients 150 the suspicious entity is installed or downloaded on, the hygiene score of the clients 150 that the suspicious entity is installed or downloaded on and the aggregate performance values of the clients 150 the suspicious entity is installed or downloaded on.

The false positive evaluation module 442 communicates the results of the false positive evaluation to the reporting module 452. In some embodiments, the false positive evaluation module 442 may report the signature detection event to an administrator of the security server for further evaluation.

Figure 5:
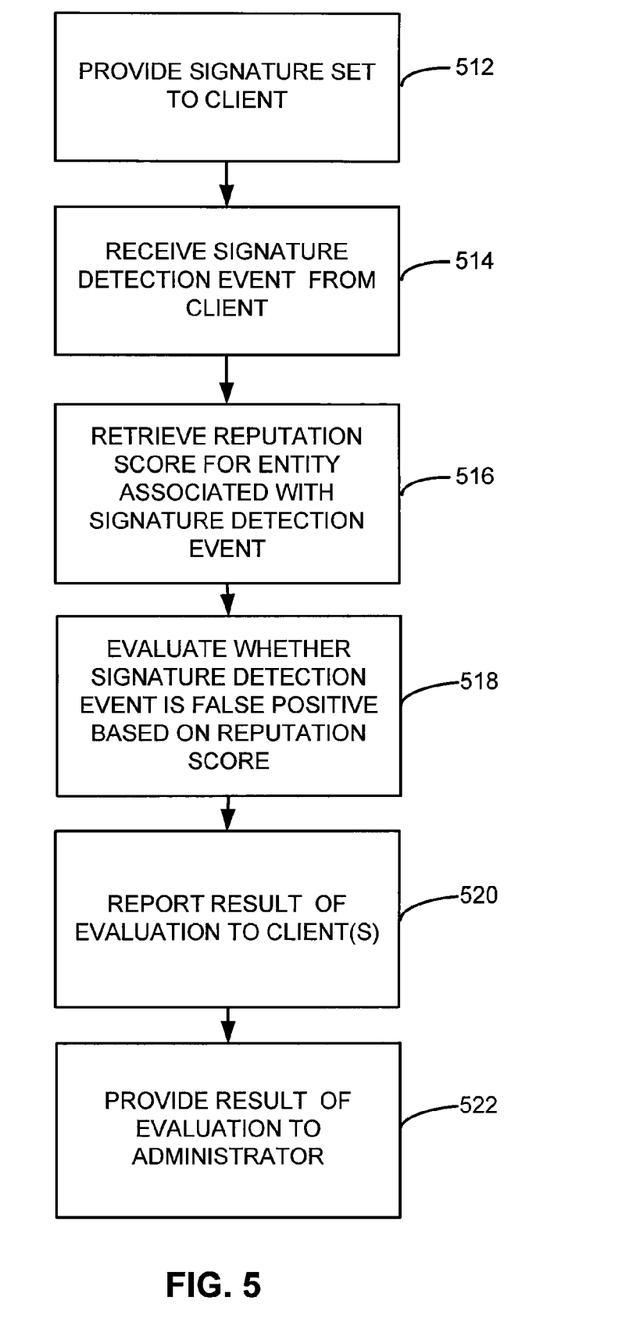
FIG. 5 is a flowchart illustrating steps performed by the signature evaluation engine 174 to evaluate a signature detection event according to one embodiment.

FIG. 5 is a flowchart illustrating steps performed by the signature evaluation engine 174 to provide evaluations of signature detection events to a client 150 according to one embodiment. Other embodiments perform the illustrated steps in different orders, and/or perform different or additional steps. Moreover, some of the steps can be performed by engines or modules other than the signature evaluation engine 174.

The signature evaluation engine 174 provides 512 a signature set to the client 150. The signature evaluation engine 174 receives 514 a signature detection event report including the malware signature detected in the signature detection event and a unique identifier for the suspicious entity identified in the signature detection event. The signature evaluation engine 174 retrieves 516 a reputation score for the suspicious entity from the reputation score database 432 based on the unique identifier for the suspicious entity. The signature evaluation engine 174 evaluates 518 whether the signature detection event is a false positive signature detection event based on the reputation score for the suspicious entity. The signature evaluation engine 174 provides 520 the results of this evaluation to the client 150. The signature evaluation engine 174 provides 522 results which indicate that a signature detection event is a false positive signature detection event to a security administrator for further evaluation.

Figure 6:
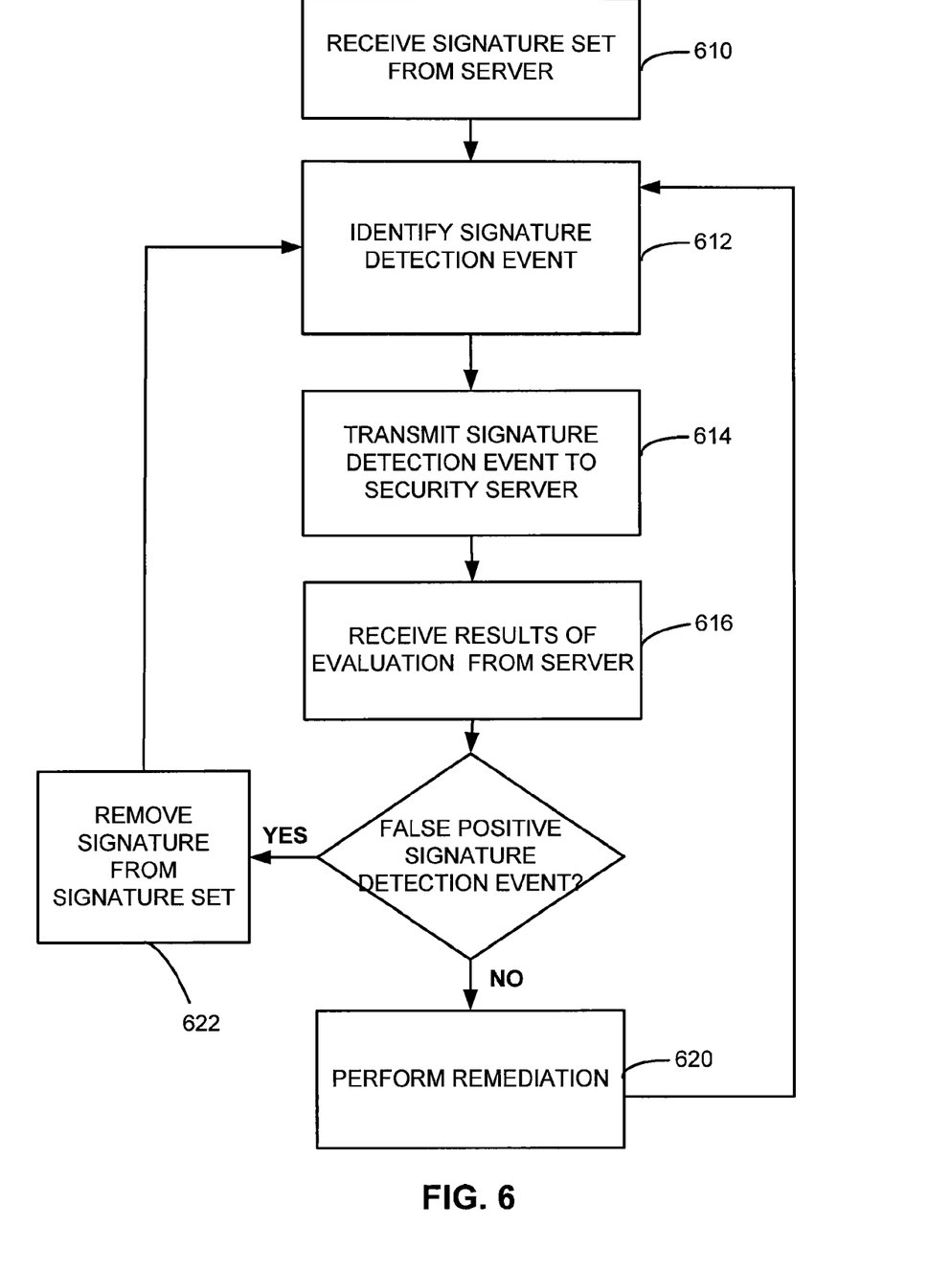
FIG. 6 is a flowchart illustrating steps performed by the security module 116 to evaluate a signature detection event according to one embodiment.

FIG. 6 is a flowchart illustrating steps performed by the security module 116 on the client 150 to detect and evaluate signature detection events according to one embodiment. Other embodiments perform the illustrated steps in different orders, and/or perform different or additional steps. Moreover, some of the steps can be performed by engines or modules other than the security module 116.

The security module 116 receives 610 a signature set 310 including one or more malware signatures from the security server 110. The security module 116 identifies 612 a signature detection event based on the identification of a malware signature in an entity stored or installed in the memory 206 or storage device 208 associated with the client 150. The security module 116 transmits 614 the signature detection event report identifying the malware signature detected in the signature detection event and the suspicious entity in which the signature was detected. The security module 116 receives 616 an evaluation of the signature detection event from the security server, the evaluation indicating whether the signature detection event is a false positive signature detection event. If the signature detection event is a false positive signature detection event, the security module 116 removes 622 the false positive signature detected in the false positive signature detection event from the signature set 310 and/or performs other actions such as suppressing the event at the client 150 or reporting the event. If the signature detection event is not a false positive signature detection event, the security module 110 performs a remediation 620 of the client 150, the remediation including removing the suspicious entity from the client.

The above description is included to illustrate to a client 150 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of evaluating a signature detection event, comprising:
   using a computer to perform steps comprising:
   identifying a signature detection event indicating a detection of a malware signature in association with a possible malicious software entity identified at a client;
   identifying a reputation score associated with the entity, the reputation score indicating a likelihood that the entity at the client is malicious, wherein the reputation score is generated based on a plurality of hygiene scores of a plurality of clients on which the entity is identified, and the plurality of hygiene scores indicate a plurality of rates of malicious software infection of the plurality of clients;
   evaluating whether the signature detection event is a false positive signature detection event based on the reputation score; and
   reporting whether the signature detection event is a false positive signature detection event.

2. The method of claim 1, further comprising:
   receiving, from the plurality of clients, data describing the entity;
   generating the reputation score based on the data describing the entity; and
   storing the reputation score in association with the entity.

3. The method of claim 2, wherein the data describing the entity indicate whether the entity is installed on a client and generating the reputation score further comprises:
   generating the reputation score based on a number of clients on which the entity is installed.

4. The method of claim 1, further comprising:
   receiving, from the plurality of clients on which the entity is installed, performance data describing the system performance of the plurality of clients;
   generating the reputation score based on the performance data; and
   storing the reputation score in association with the entity.

5. The method of claim 1, wherein the malware signature is part of a set of malware signatures and further comprising:
   responsive to evaluating that the signature detection event is a false positive signature detection event, removing the malware signature from the set of malware signatures.

6. The method of claim 1, further comprising:
   transmitting, to a server from the client, a signature detection event report identifying the malware signature and the entity; and
   receiving, at the client from the server, an evaluation indicating whether the signature detection event is a false positive signature detection event.

7. The method of claim 6, further comprising:
   responsive to receiving an evaluation indicating that the signature detection event is not a false positive signature detection event, remediating the client.

8. A non-transitory computer-readable storage medium encoded with executable program code for evaluating a signature detection event, the program code comprising program code for:
   identifying a signature detection event indicating a detection of a malware signature in association with a possible malicious software entity identified at a client;
   identifying a reputation score associated with the entity, the reputation score indicating a likelihood that the entity at the client is malicious, wherein the reputation score is generated based on a plurality of hygiene scores of a plurality of clients on which the entity is identified, and the plurality of hygiene scores indicate a plurality of rates of malicious software infection of the plurality of clients;
   evaluating whether the signature detection event is a false positive signature detection event based on the reputation score; and
   reporting whether the signature detection event is a false positive signature detection event.

9. The medium of claim 8, further comprising program code for:
   receiving, from the plurality of clients, data describing the entity;
   generating the reputation score based on the data describing the entity; and
   storing the reputation score in association with the entity.

10. The medium of claim 9, wherein the data describing the entity indicate whether the entity is installed on a client and the program code for generating the reputation score further comprises program code for:
    generating the reputation score based on a number of clients on which the entity is installed.

11. The medium of claim 8, further comprising program code for:
    receiving, from the plurality of clients on which the entity is installed, performance data describing the system performance of the plurality of clients;
    generating the reputation score based on the performance data; and
    storing the reputation score in association with the entity.

12. The medium of claim 8, wherein the malware signature is part of a set of malware signatures and further comprising program code for:
    responsive to evaluating that the signature detection event is a false positive signature detection event, removing the malware signature from the set of malware signatures.

13. The medium of claim 8, further comprising program code for:
    transmitting, to a server from the client, a signature detection event report identifying the malware signature and the entity; and
    receiving, at the client from the server, an evaluation indicating whether the signature detection event is a false positive signature detection event.

14. The medium of claim 13, further comprising program code for:
    responsive to receiving an evaluation indicating that the signature detection event is not a false positive signature detection event, remediating the client.

15. A computer system for evaluating a signature detection event, the system comprising:
    a non-transitory computer-readable storage medium storing executable computer program modules comprising:
    a signature detection module adapted to identify a signature detection event indicating a detection of a malware signature in association with a possible malicious software entity identified at a client;
a false positive evaluation module adapted to:
identify a reputation score associated with the entity, the reputation score indicating a likelihood that the entity at the client is malicious, wherein the reputation score is generated based on a plurality of hygiene scores of a plurality of clients on which the entity is identified, and the plurality of hygiene scores indicate a plurality of rates of malicious software infection of the plurality of clients; and
evaluate whether the signature detection event is a false positive signature detection event based on the reputation score;
a reporting module adapted to report whether the signature detection event is a false positive signature detection event; and
a processor for executing the computer program modules.

16. The system of claim 15, wherein:
the reporting module is further adapted to receive, from the plurality of clients, data describing the entity;
and further comprising:
a reputation score generation module adapted to generate the reputation score based on the data describing the entity; and
a reputation score database adapted to store the reputation score in association with the entity.

17. The system of claim 16, wherein the data describing the entity indicate whether the entity is installed on a client and the reputation score generation module is further adapted to:
generate the reputation score based on a number of clients on which the entity is installed.

18. The system of claim 15, wherein:
the reporting module is further adapted to receive, from the plurality of clients on which the entity is installed, performance data describing the system performance of the plurality of clients;
and further comprising:
a reputation score generation module is further adapted to generate the reputation score based on the performance data; and
a reputation score database adapted to store the reputation score in association with the entity.

19. The method of claim 1, wherein a software entity identified on a plurality of clients having a high rate of infection receives a reputation score lower than a software entity identified on a plurality of clients having a low rate of infection.

20. The method of claim 1, wherein a signature detection event of a possible malicious software entity having a higher reputation score is more likely a false positive signature detection event than a signature detection event of a possible malicious software entity having a lower reputation score.

* * * * *